United States Patent

[11] 3,583,732

| [72] | Inventors | James Arnold Dennis<br>Perrysberg, Ohio;<br>James William Helmick, Toledo, Ohio |
|---|---|---|
| [21] | Appl. No. | 831,008 |
| [22] | Filed | June 6, 1969 |
| [45] | Patented | June 8, 1971 |
| [73] | Assignee | Johns-Manville Corporation<br>New York, N.Y. |

[54] TUBULAR DUCT LONGITUDINAL REINFORCEMENT AND CONNECTOR SYSTEM
1 Claim, 5 Drawing Figs.

[52] U.S. Cl. ............................................... 285/293, 138/129, 285/423, 285/425
[51] Int. Cl. ..................................................... F16l 21/00, F16l 11/02
[50] Field of Search ........................................... 285/293, 425, 288, 260, 423; 138/120, 129, 172, 155, 109, 131

[56] References Cited
UNITED STATES PATENTS

| 1,959,511 | 5/1934 | Venzie ........................ | 285/288 |
| 2,794,483 | 6/1957 | Hopkins et al. ............... | 285/293 |
| 2,924,546 | 2/1960 | Shaw .......................... | 285/293X |
| 3,502,114 | 3/1970 | Hay ............................ | 138/129 |

FOREIGN PATENTS

| 852,544 | 10/1939 | France ........................ | 285/425 |

*Primary Examiner*—Thomas F. Callaghan
*Attorneys*—John A. McKinney and Robert M. Krone

ABSTRACT: One or more runs of wire are extended longitudinally of tubular duct and secured to the end structures thereof to provide longitudinal reinforcement against tensile forces imposed on the duct. Free ends of the wire extend beyond the duct to afford means to secure the end of the duct to associated elements of the connector system. Abutting duct ends are secured by tying their respective ends of wire together and sealing the abutting ends of duct with closure tape. Duct can be secured to metal or like solid structures by tying the wire to the structure and sealing the walls thereto with closure tape.

PATENTED JUN 8 1971
3,583,732
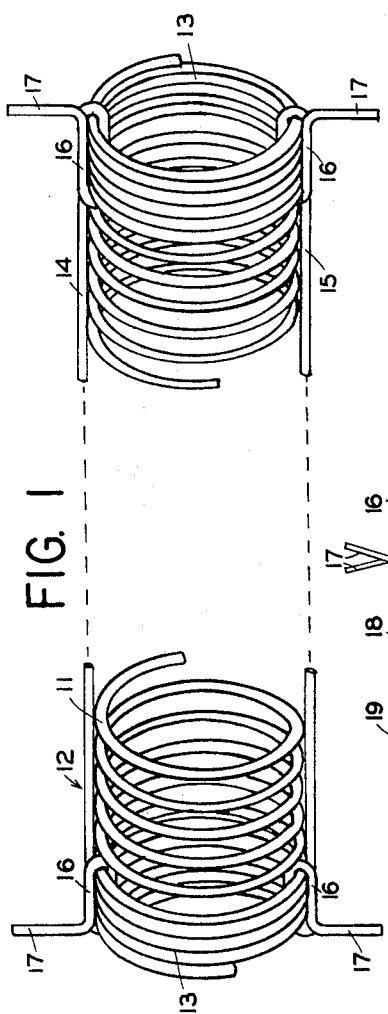
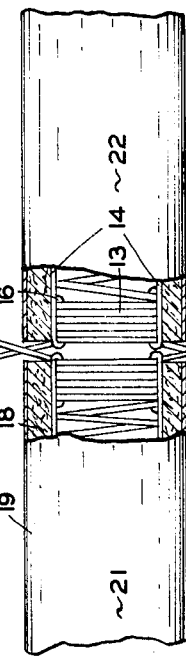
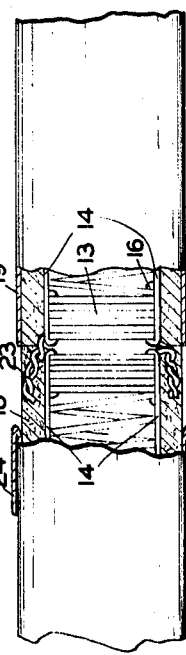
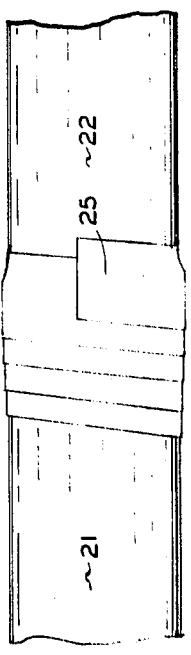
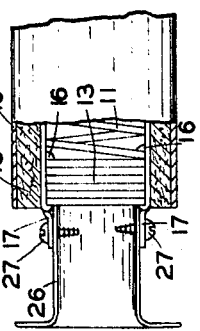
INVENTORS
JAMES ARNOLD DENNIS
JAMES WILLIAM HELMICK
BY
*John A. McKinney*
ATTORNEY

TUBULAR DUCT LONGITUDINAL REINFORCEMENT AND CONNECTOR SYSTEM

CROSS-REFERENCE TO RELATED APPLICATION

This invention while not limited exclusive to use with a particular duct form is illustrated as applied to flexible duct of the type disclosed in the U.S. Pat. application of James William Helmick, John Marvin Current and George John Hannes entitled "Flexible Conduit" which was filed herewith as Ser. No. 831,175.

SUMMARY OF THE INVENTION

The present invention relates to fluid ducts and more particularly to structures for connecting fluid ducts to associated elements and for reinforcing fluid ducts against tensile forces applied along their length.

An object of the invention is to simplify and reduce the expense of fluid duct systems.

Another object is to increase the strength of fluid duct systems.

A feature of the invention is the incorporation of a run of wire generally parallel to the length of a section of duct to sustain tensile forces applied to the duct along its length and to provide wire ends extending from the duct section ends for the connections to associated elements.

DESCRIPTION OF THE DRAWING

FIG. 1 is a perspective of a helical skeleton for a flexible duct with two reinforcing and connecting wires applied according to this invention;

FIGS. 2 through 4 are side elevations of the ends of two sections of flexible duct, partially sectioned and showing progressively the means for forming a joint for the abutting ends of such duct according to this invention; and FIG. 5 is a partially sectioned side elevation of the flexible duct connected to a sheet metal collar.

DESCRIPTION OF A PREFERRED EMBODIMENT

FIG. 1 shows a helix 11 forming the skeleton 12 for a flexible duct of the type disclosed in the above mentioned application of Current, Hannes, and Helmick. The ends of the skeleton 12 provide collars 13 by having the end turns of helix 11 in abutting side-by-side relation and bonded to each other. In fabricating the flexible duct, the helix is preformed of phenolic resin bonded glass filaments, is located on a support with its turns distributed as illustrated, and is clamped for further processing by a mandrel (not shown) within and extending the length of the skeleton. The mandrel can be three bars parallel to the helix axis, spaced 120° from each other around that axis, and expanded against the helix turns.

Longitudinal reinforcement and connecting means are applied to skeleton 12 according to this invention by extending wire runs 14 and 15 along the helix 11 approximately on diametrically opposed portions of its cross section, by securing those runs to the end collar sections of the skeleton by one or more turns 16 around the collars parallel to the helix axis and by extending the ends 17 of the wire a convenient length beyond the collar wraps 16 to provide free ends for tying to complementary elements of the ducting system. Advantageously, the wire should be soft, as annealed aluminum alloy, and can be between 0.050 and 0.090 inch in diameter to provide a necessary strength and flexibility.

The fabrication of the duct is completed by applying adhesive to the outer face of the skeleton and the wire runs, wrapping flexible sheet material as thermal insulating, glass fiber mat blanket 18 over the skeleton and wire runs, and jacketing the blanket with a gas impermeable outer skin 19. The skin 19 can be a tube of vinyl chloride film of adequate thickness to provide the requisite strength, e.g. 0.003 inch. The finished duct sections are prepared for shipment by tucking the free wire ends 17 into the open center of the ducts.

Connection of a pair of abutting ends of flexible duct is accomplished as illustrated in FIGS. 2 through 4. Prior to abutting the ends of duct sections 21 and 22, the wire ends 17 are bent to extend outside the duct. The wires from the abutting duct sections are then twisted together to form a wire tie 23 and the jacket 19 is turned back on one side as at 24 in FIG. 3. Ties 23 are inserted into insulating blanket 18, preferably between blanket layers where multiple layers are present. Jacket 19 is folded back over the exposed blanket to eliminate the fold 24 and provide closely adjacent jacket ends on sections 21 and 22. A closure tape 25, which may be of a suitable flexible film or fabric is then wound on the jackets 19 and secured thereto by adhesive. The bonded helix turns in collars 13 provide sufficient rigidity to obtain a tight seal for the joint.

A connection of the flexible duct to a rigid collar 26 is shown in FIG. 5 where the collars 13 are fitted over collar 26 and wire ends 17 are wrapped around fasteners such as sheet metal screws 27 in the collar.

While the invention is described as applied to a particular flexible duct construction, it is to be understood that it can be applied advantageously to other duct forms. Thus, the flexible duct could be of other materials as a metallic wire helix or a skin including other thermal insulation, reflective layers, or merely a gas impervious layer. It could be formed with preformed end collars of compressed fibrous mat to which the helical skeleton is secured, instead of the end collars of adjacent bonded helical turns. The reinforcing wire can be secured to such preformed end collars by wrapping as described. Where coupling of duct is the sole consideration, the wire 14 need not run the length of the duct section. In rigid duct, the wire can be employed as a coupling means either extending the length of the duct, or secured to the duct adjacent its ends. Accordingly, the above description is presented as illustrative, and is not to be read in a limiting sense.

We claim:

1. A joint for coupling a pair of abutting ends of flexible tubular duct comprising; each of said ducts having a helical skeleton covered by an insulating blanket and a gas impermeable jacket enclosing said blanket, said helices at the abutting ends being bonded together in side-by-side relationship to define collars, a first wire looped around and secured to a first of said collars and extending therefrom, a second wire looped around and secured to a second of said collars, a junction tie between said wires, said tie being located beneath the outer jacket, and a closure tape bridging the joint between said ducts.